(12) United States Patent
Duval

(10) Patent No.: US 9,178,442 B2
(45) Date of Patent: Nov. 3, 2015

(54) THREE-PHASE/TWO-PHASE ROTARY TRANSFORMER

(71) Applicant: LABINAL POWER SYSTEMS, Blagnac (FR)

(72) Inventor: Cedric Duval, Samois sur Seine (FR)

(73) Assignee: LABINAL POWER SYSTEMS, Blagnac (FR)

( * ) Notice: Subject to any disclaimer, the term of this patent is extended or adjusted under 35 U.S.C. 154(b) by 0 days.

(21) Appl. No.: 14/400,230

(22) PCT Filed: May 3, 2013

(86) PCT No.: PCT/FR2013/050986
§ 371 (c)(1),
(2) Date: Nov. 10, 2014

(87) PCT Pub. No.: WO2013/167829
PCT Pub. Date: Nov. 14, 2013

(65) Prior Publication Data
US 2015/0124509 A1    May 7, 2015

(30) Foreign Application Priority Data

May 10, 2012  (FR) ....................................... 12 54294

(51) Int. Cl.
*H01F 21/06*   (2006.01)
*H02M 5/14*    (2006.01)
*H01F 38/18*   (2006.01)
*H01F 30/14*   (2006.01)

(52) U.S. Cl.
CPC ................. *H02M 5/14* (2013.01); *H01F 30/14* (2013.01); *H01F 38/18* (2013.01)

(58) Field of Classification Search
CPC ......... H01F 38/18; H01F 30/14; H01F 21/06; H02M 5/14
USPC ............ 323/215, 216, 218; 336/120; 310/266
See application file for complete search history.

(56) References Cited

U.S. PATENT DOCUMENTS

| 2011/0050377 | A1 | 3/2011 | Bjerknes et al. |
| 2012/0280777 | A1 | 11/2012 | Robert |
| 2014/0340185 | A1* | 11/2014 | Verleur et al. ................ 336/120 |
| 2015/0116067 | A1* | 4/2015 | Duval .......................... 336/120 |

FOREIGN PATENT DOCUMENTS

| EP | 0 688 028 | 12/1995 |
| FR | 2 953 321 | 6/2011 |
| WO | WO 2014029941 A1 * | 2/2014 |

OTHER PUBLICATIONS

International Search Report Issued Sep. 25, 2013 in PCT/FR13/050986 Filed May 3, 2013.

* cited by examiner

*Primary Examiner* — Adolf Berhane
(74) *Attorney, Agent, or Firm* — Oblon, McClelland, Maier & Neustadt, L.L.P.

(57) ABSTRACT

A three-phase/two-phase rotary transformer including a three-phase portion and a two-phase portion that are movable in rotation relative to each other about an axis A. The three-phase portion includes a first body made of ferromagnetic material and three-phase coils, the two-phase portion including a second body made of ferromagnetic material and two-phase coils. The second body defines a first annular slot of axis A and a second annular slot of axis A, the two-phase coils including a first toroidal coil of axis A in the first slot, a second toroidal coil of axis A in the first slot, a third toroidal coil of axis A in the second slot, and a fourth toroidal coil of axis A in the second slot, the first coil and the fourth coil being connected in series, the second coil and the third coil being connected in series.

7 Claims, 5 Drawing Sheets

THREE-PHASE/TWO-PHASE ROTARY TRANSFORMER

BACKGROUND OF THE INVENTION

The present invention relates to the general field of transformers. In particular, the invention relates to a three-phase/two-phase transformer.

In certain situations, it may be necessary to transfer energy in balanced manner from a three-phase source to a two-phase source. There already exist three-phase/two-phase static transformers, in particular one known as a Scott connection and the other known as a Leblanc connection circuit. Nevertheless, a three-phase/two-phase rotary transformer does not exist.

To perform this function, one solution consists in using a three-phase/two-phase static transformer and two single-phase rotary transformers. Another solution consists in using three single-phase rotary transformers using the Leblanc connection.

Nevertheless, both of those solutions require large weights and volumes. Furthermore, in the first solution, there are problems of residual magnetization and of current surges when switching on.

There exists a need for an improved solution enabling energy to be transferred in balanced manner from a three-phase source to a two-phase source.

OBJECT AND SUMMARY OF THE INVENTION

The invention proposes a three-phase/two-phase rotary transformer comprising a three-phase portion and a two-phase portion that are movable in rotation relative to each other about an axis A;
the three-phase portion comprising a first body made of ferromagnetic material and three-phase coils, the two-phase portion comprising a second body made of ferromagnetic material and two-phase coils;
the second body defining a first annular slot of axis A and a second annular slot of axis A, the first slot being defined by a first side leg, a central leg, and a ring, the second slot being defined by the central leg, a second side leg, and the ring; and
the two-phase coils comprising a first toroidal coil of axis A in the first slot, a second toroidal coil of axis A in the first slot, a third toroidal coil of axis A in the second slot, and a fourth toroidal coil of axis A in the second slot, the first coil and the second coil being connected in series, the second coil and the third coil being connected in series;
wherein given the winding directions and the connection directions of the coils, a current flowing in the first coil and the fourth coil corresponds, for the first coil, to a first magnetic potential and, for the fourth coil, to a second magnetic potential opposite to the first magnetic potential, and a current flowing in the second coil and in the third coil corresponds, for the second coil, to a third magnetic potential and, for the third coil, to a fourth magnetic potential opposite to the second magnetic potential.

Thus, the three-phase/two-phase conversion and the transfer between two reference frames, one of which is turning relative to the other, are both performed in the same three-phase/two-phase rotary transformer. This transformer presents limited weight and volume.

Advantageously, the first coil and the third coil each presents a number $n_a$ of turns, and the second coil and the fourth coil each presents a number $n_b$ of turns, with $n_a=(2+\sqrt{3})n_b$.

Under such circumstances, the transformer is capable of performing balanced three-phase/two-phase transfer.

In an embodiment, the three-phase portion surrounds the two-phase portion around the axis A, or vice versa. That corresponds to making a transformer that is referred to as being "U-shaped".

The three-phase portion and the two-phase portion may be situated one beside the other in the direction of the axis A. That corresponds to making a transformer that is referred to as being "E-shaped" or "pot-shaped".

In an embodiment, the first and second bodies made of ferromagnetic material completely surround the three-phase and two-phase coils. Under such circumstances, the transformer is magnetically shielded.

In an embodiment, the first body defines a third annular slot of axis A and a fourth annular slot of axis A, the third slot being defined by a third side leg, a second central leg, and a second ring, the fourth slot being defined by the second central leg, a fourth side leg, and the second ring;
the three-phase coils comprising a fifth toroidal coil of axis A in the third slot, a sixth toroidal coil of axis A in the third slot, a seventh toroidal coil of axis A in the fourth slot, and an eighth toroidal coil of axis A in the fourth slot, the sixth coil and the seventh coil being connected in series.

Under such circumstances, the three-phase portion presents a topology that contributes to limiting the volume and the weight of the transformer. Furthermore, the transformer can be made using toroidal coils only and therefore does not require coils that are more complex in shape.

In an embodiment, the two-phase portion further comprises at least one set of three-phase coils. In known manner, a transformer may have a plurality of secondaries. In this example, the use of a balanced two-phase secondary and of at least one three-phase secondary enables balanced transfer to be performed to an arbitrary number of sources.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF EMBODIMENTS

Figure 1:
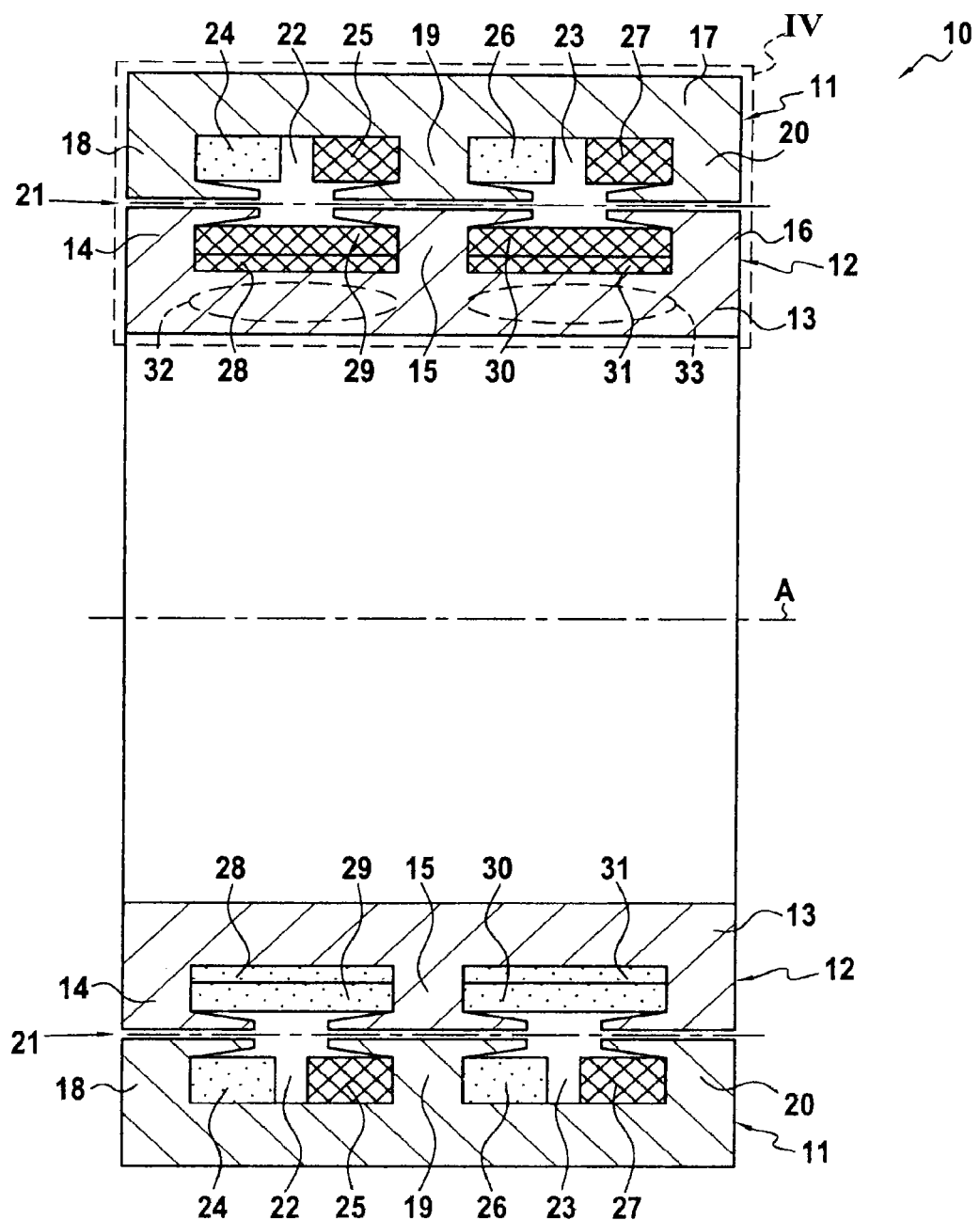
FIG. 1 is a section view of a magnetically shielded three-phase/two-phase rotary transformer with forced linked fluxes in a first embodiment of the invention.

FIG. 1 is a section view of a rotary transformer 10 in a first embodiment of the invention. The transformer 10 is a magnetically shielded three-phase/two-phase rotary transformer with forced linked fluxes.

The transformer 10 comprises a three-phase portion 11 and a two-phase portion 12 that are suitable for rotating relative to each other about an axis A. By way of example portion 11 is a stator and the portion 12 is a rotor, or vice versa. In a variant, the portion 11 and the portion 12 are both movable in rotation relative to a stationary frame of reference (not shown).

The portion 12 comprises a ring 13 of axis A and three legs 14, 15, and 16 made of the ferromagnetic material. Each of the legs 14, 15, and 16 extends radially away from the axis A, starting from the ring 13. The leg 14 is at one end of the ring 13, the leg 16 is at another end of the ring 13, and the leg 15 lies between the legs 14 and 16. The ring 13 and the legs 14 and 15 define an annular slot 34 that is open in a radially outward direction. The ring 13 and the legs 15 and 16 define an annular slot 35 that is open in a radially outward direction. In general manner, the ring 13 and the legs 14, 15, and 16 form a body of ferromagnetic material defining two annular slots 34 and 35 that are open in a radially outward direction.

The portion 11 comprises a ring 17 of axis A and three legs 18, 19, and 20 made of the ferromagnetic material. The ring 17 surrounds the ring 13. Each of the legs 18, 19, and 20 extends radially towards the axis A, starting from the ring 17. The leg 18 is at one end of the ring 17, the leg 20 is at another end of the ring 17, and the leg 19 lies between the legs 18 and 20. The ring 17 and the legs 18 and 19 define an annular slot 22 that is open in a radially inward direction. The ring 17 and the legs 19 and 20 define an annular slot 23 that is open in a radially inward direction. In general manner, the ring 17 and the legs 18, 19, and 20 form a body of ferromagnetic material defining two annular slots 22 and 23 that are open in a radially inward direction.

The legs 14 and 18, 15 and 19, and also 16 and 20 face each other as to define an airgap 21, thereby forming the columns of the transformer 10.

Figure 2:
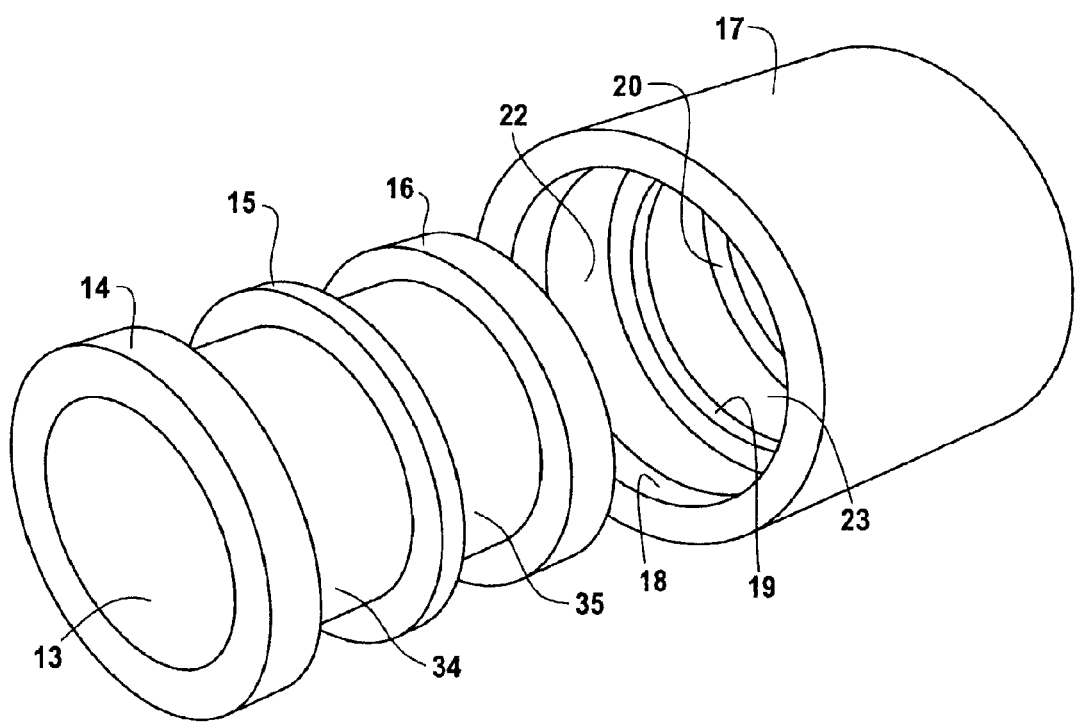
FIG. 2 is an exploded perspective view of the magnetic circuit of the FIG. 1 transformer.

The rings 13 and 17 together with the legs 14 to 16 and 18 to 20 form a magnetic circuit of the transformer 10. The transformer 10 is thus a three-column transformer. More precisely, the magnetic circuit of the transformer 10 has a first column (corresponding to the legs 14 and 18), a second column (corresponding to the legs 15 and 19), and a third column (corresponding to the legs 16 and 20). FIG. 2 is an exploded perspective view showing the magnetic circuit of the FIG. 10 transformer.

With reference once more to FIG. 1, the three-phase portion 11 comprises coils 24, 25, 26, and 27, and the two-phase portion 12 comprises coils 28, 29, 30, and 31. Below, the notation p and s is used with reference to a configuration in which the coils 24 the 27 are the primary coils of the transformer 10 and the coils 28 to 31 are the secondary coils of the transformer 10. Nevertheless, primary and secondary may naturally be inverted relative to the example described.

The coil 24 is a toroidal coil of axis A corresponding to a phase Up of the transformer 10. It is located in the slot 22. The coil 25 is a toroidal coil of axis A and it is located in the slot 22. The coil 26 is a toroidal coil of axis A, it is located in the slot 23, and it is connected in series with the coil 25. The coils 25 and 26 correspond to a phase Vp of the transformer 10. Finally, the coil 27 is a toroidal coil of axis A corresponding to a phase Wp of the transformer 10. It is located in the slot 23. Each of the coils 24 to 27 presents $n_1$ turns.

The term "toroidal coil of axis A" is used to mean a coil having its turns wound around the axis A. Herein, the term "toroidal" is not used in the limited meaning referring to a solid as generated by rotating a circle about an axis. On the contrary, as in the examples shown, the section of a toroidal coil may be rectangular, in particular.

The coil 28 is a toroidal coil of axis A and it is located in the slot 34. The coil 29 is a toroidal coil of axis A and it is located in the slot 34. The coil 30 is a toroidal coil of axis A and it is located in the slot 35. Finally, the coil 31 is a toroidal coil of axis A and it is located in the slot 35. The coil 28 and the coil 30 are connected in series and correspond to a phase $V_1$ of the two-phase portion 12. In corresponding manner, the coil 29 and the coil 31 are connected in series and correspond to a phase $V_2$ of the two-phase portion 12.

The coils 24, 25, 28, and 29 surround a magnetic core 32 situated in the ring 13. The term "magnetic core" is used to mean a portion of the magnetic circuit in which the same-direction flux created by the coil is in the majority. Electric currents flowing in the coils 24 and 25 thus correspond to magnetic potentials in the magnetic core 32. In corresponding manner, the coils 26, 27, 30, and 31 surround a magnetic core 33 situated in the ring 13. Electric currents flowing in the coils 26 and 27 thus correspond to magnetic potentials in the magnetic core 33.

Figure 3A:
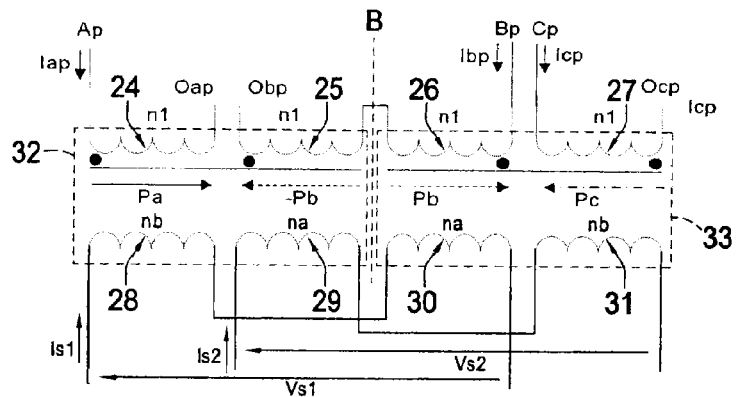
FIGS. 3A to 3E are electrical circuit diagrams showing a plurality of variants for connecting the coils of the FIG. 1 transformer.
Figure 3B:
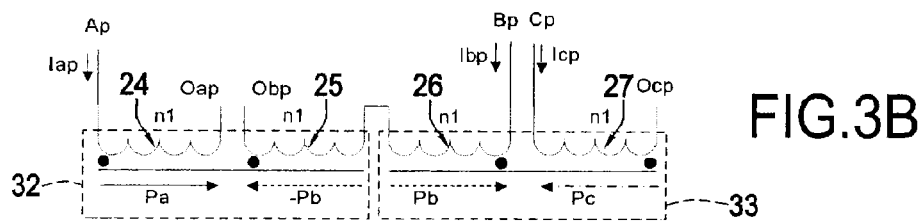
Figure 3C:
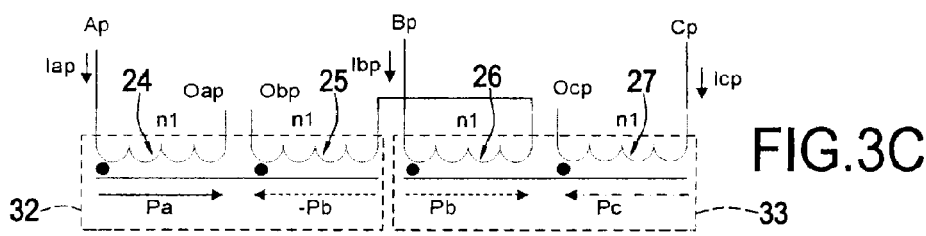
Figure 3D:
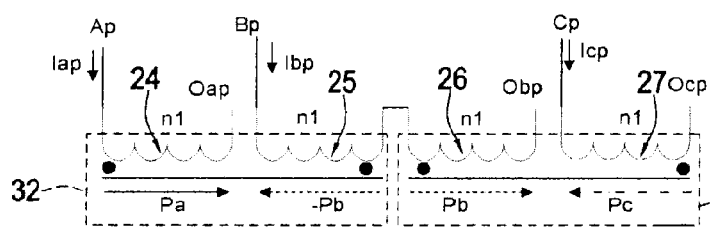
Figure 3E:
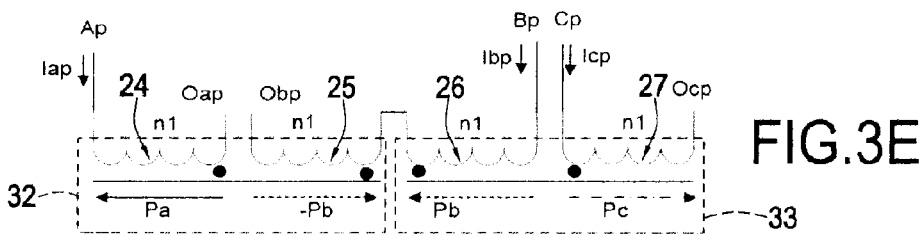

With reference to FIG. 3A, there follows an explanation of how the transformer 10 operates. Below and in FIG. 3, the following notation is used:

$A_p$, $B_p$, and $C_p$, are the inlet points of the three-phase coils of the transformer 10. The phases U, V, and W of FIG. 1 correspond respectively to the phases A, B, and C of FIG. 3A, but all other types of correspondence are possible.

$I_{ap}$, $I_{bp}$, and $I_{cp}$ are the respective incoming currents at the points $A_p$, $B_p$, and $C_p$.

$V_{ap}$ is the voltage of the phase A of the three-phase portion 11;

$O_{ap}$, $O_{bp}$, and $O_{cp}$ are the connection points making possible electrical couplings identical to all kinds of static three-phase transformer (star-star, star-delta, delta-delta, delta-star, zigzag, ... ).

Black dots show the relationship between the current flowing in a coil and the direction of the corresponding magnetic potential: If the point is on the left of the coil, the coil is wound in a direction such that the magnetic potential created is in the same direction as the incoming current (clockwise winding). If the point is on the right of the coil, the winding direction causes the magnetic potential that is created to be in the opposite direction relative to the incoming current (winding in the counter-clockwise direction).

Pa, –Pb, Pb, and Pc are the magnetic potentials in that the cores 32 and 33 corresponding respectively to the currents $I_{ap}$, $I_{bp}$, and $I_{cp}$;

$n_a$ is the number of turns of the coils 29 and 30;

$n_b$ is the number of turns of the coils 28 and 31;

$n_t = n_a + n_b$ is the total number of turns of each phase $V_1$ and $V_2$;

$I_{s1}$, $I_{s2}$ are the respective currents in the phases $V_1$ and $V_2$ of the two-phase portion 12;

$V_{s1}$, $V_{s2}$ are the respective voltages of the phases $V_1$ and $V_2$ of the two-phase portion 12.

Given the winding directions and the series connection of the coils 25 and 26 shown in FIG. 3A, the current $I_{bp}$ corresponds, in the core 32, to a magnetic potential –Pb in the direction opposite to the magnetic potential Pa, and in the core 33, to a magnetic potential Pb in the direction opposite to the magnetic potential Pc.

FIGS. 3B to 3E are diagrams similar to that of FIG. 3A in which only the three-phase primary is shown, and they show variant series connections and winding directions that enable the same effect to be obtained.

Thus, the transformer 10 makes it possible to generate magnetic potentials Pa, Pb, and Pc that are equal in modulus and opposite in direction on each magnetic core 32 and 33 and that are symmetrical relative to the axis of symmetry B between the two magnetic cores.

The magnetic coupling performed by the magnetic circuit with the winding topologies of FIGS. 3A to 3E makes it possible to have the same 3/2 coupling coefficient on the magnetic fluxes created as on a static three-phase transformer with forced fluxes relative to a single-phase transformer. In order to have the best coupling coefficient, it is necessary for the reluctances of each of the magnetic columns, due mainly to the airgap, to be equal. Specifically, as in a static three-phase transformer with forced fluxes, it is necessary to create equivalent reluctances in each of the columns that are higher than the reluctances of the magnetic material. In a rotary transformer, this is achieved naturally by the airgap.

The phases of the three-phase portion 11 of the transformer 10 may be balanced in inductance and in resistance.

Specifically, the inductance of the phase formed by the coils 25 and 26 that has a total of $2*n_1$ turns is nevertheless equal to the inductances of the other phases having $n_1$ turns since the geometry of the magnetic circuit serves to cancel half of the flux in each half-coil. More precisely, the coil 25 has the same number of turns as the coil 24 and sees the same magnetic circuit, and the same applies for the coil 26 and the coil 27. However, the coils 24 and 27 are symmetrical with the same number of turns, and their inductances are therefore equal. The coil 25 is wound in the opposite direction to the coil 26 and therefore has half of its flux cancelled because of the parallel connection of the central column (formed by the legs 15 and 19), and the same applies for the coil 26. The overall inductance of the coils 25 and 26 is thus equal to the overall inductance of the coils 24 and 27.

Resistances can be balanced by selecting the sections of the conductors of the coils in appropriate manner. The sections of the phases U and W having $n_1$ turns are equal, whereas the section of the phase V that has $2*n_1$ turns is twice that of the preceding sections. Specifically, in order to conserve balanced resistances in the phases, the phase that is twice as long must also have twice the sectional area in order to compensate for its greater length.

On the two-phase side, in order to ensure the fluxes are properly linked, it is necessary for the ampere-turns (the magnetic potential) of each of the two coils in a given phase, distributed over each of the magnetic cores 32 and 33, to be of opposite directions. Several configurations of current direction and of winding direction enable this condition to be satisfied. For a ratio of $n_a=(2+\sqrt{3})n_b$, the voltages in the two-phase portion 12 have the same values and they are in quadrature. Each phase $V_1$ and $V_2$ possesses the same number $n_t$ of coil turns, and it is thus symmetrical relative to the magnetic circuit. The resistances and the self and mutual inductances of each phase are thus balanced. Likewise, by geometry, the leakage inductances are also balanced.

In other words, the ratio $n_a=(2+\sqrt{3})n_b$ makes it possible to transmit energy and/or signals from a three-phase source to a two-phase source in balanced manner.

If the above-mentioned condition concerning the direction of ampere turns is complied with, the configuration of the transformer 10 does not act on the quadrature (mutual phase offset of $\pm\pi/2$) between the voltages and the currents on the two-phase side, but only on the phase difference between the three-phase portion 11 and the two-phase portion 12.

The ratio of the currents is given by:

$$\frac{I_{ap}}{I_{s1}} = \frac{\sqrt{2}}{3} \frac{n_a+n_b}{n_1}$$

The ratio of the voltages is given by:

$$\frac{V_{1s}}{V_{ap}} = \frac{1}{\sqrt{2}} \frac{n_a+n_b}{n_1}$$

The transformer 10 thus serves to transfer energy and/or signals in balanced manner between a three-phase source and a two-phase source that are rotating relative to each other, without requiring a circuit comprising a plurality of static and rotary transformers.

The transformer 10 also presents other advantages. In particular, it can be seen that the magnetic circuit completely surrounds the coils 24 to 31. The transformer 10 is thus magnetically shielded. Furthermore, the coils 24 to 31 are all toroidal coils of axis A. The transformer 10 therefore does not require coils that are more complex in shape. Finally, the transformer 10 presents reduced weight and volume.

Figure 4A:
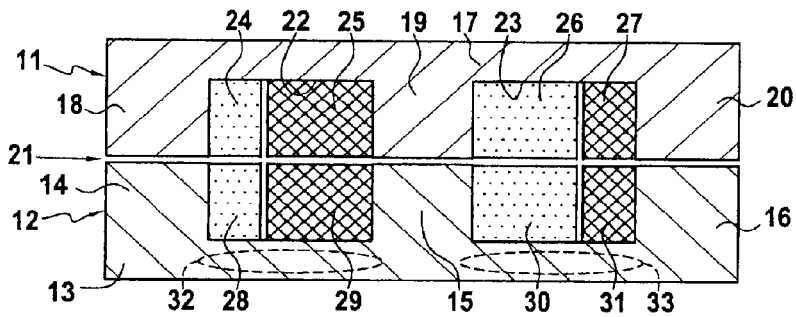
FIGS. 4A to 4C show respective details of FIG. 1 in different positioning variants for the coils.
Figure 4B:
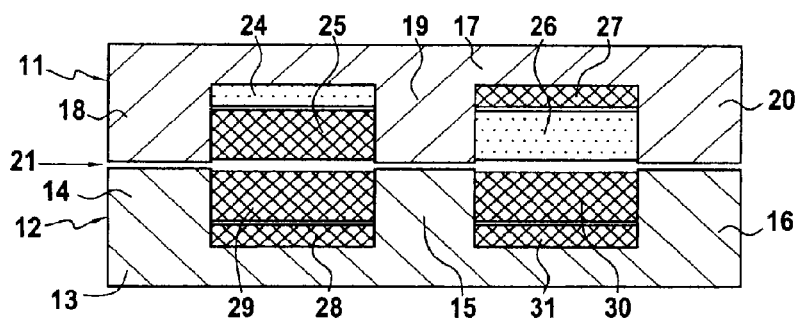
Figure 4C:
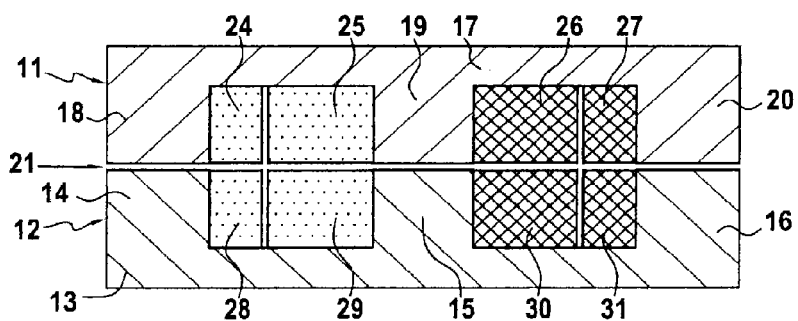

The positions of the coils 24 to 31 shown in FIG. 1 constitute one example, and other positions can be suitable. FIGS. 4A to 4C, which correspond to detail IV in FIG. 1, show respective different possibilities for positioning the coils 24 to 31.

In FIG. 4A, in a slot 22 or 23, the three-phase coils are next to each other in the axial direction, and they are wound in opposite directions. The two-phase coils are also next to each other in the axial direction, and they are wound in opposite directions.

In FIG. 6B, in a slot 22 or 23, the three-phase coils are wound around each other about the axis A, and they are wound in opposite directions. The two-phase coils are one around the other relative to the axis A, and they are wound in the same direction.

In FIG. 6C, in a slot 22 or 23, the three-phase coils are next to each other in the axial direction, and they are wound in the same direction. The two-phase coils are also next to each other in the axial direction, and they are wound in the same direction.

In a variant that is not shown, the coils in a slot 22 or 23 are mixed.

Furthermore, the positioning of the three-phase coils in any one of FIGS. 4A to 4C may be combined with the positioning of the two-phase coils in each of FIGS. 4A to 4C.

Figure 5:
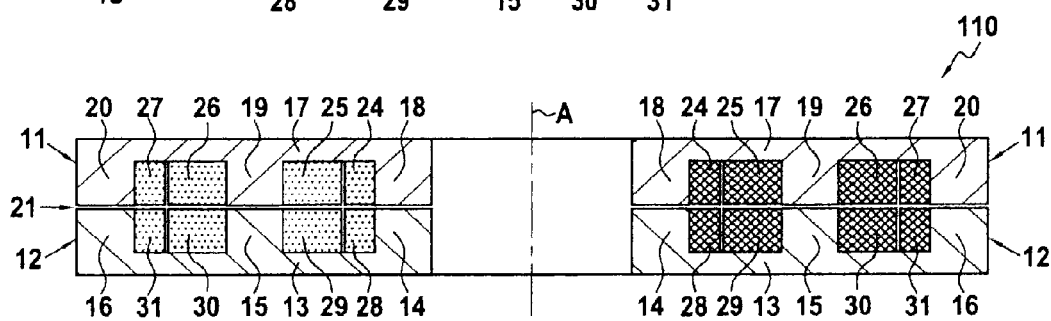
FIG. 5 is a section view of a magnetically shielded three-phase/two-phase rotary transformer with forced linked fluxes in a second embodiment of the invention.
Figure 6:
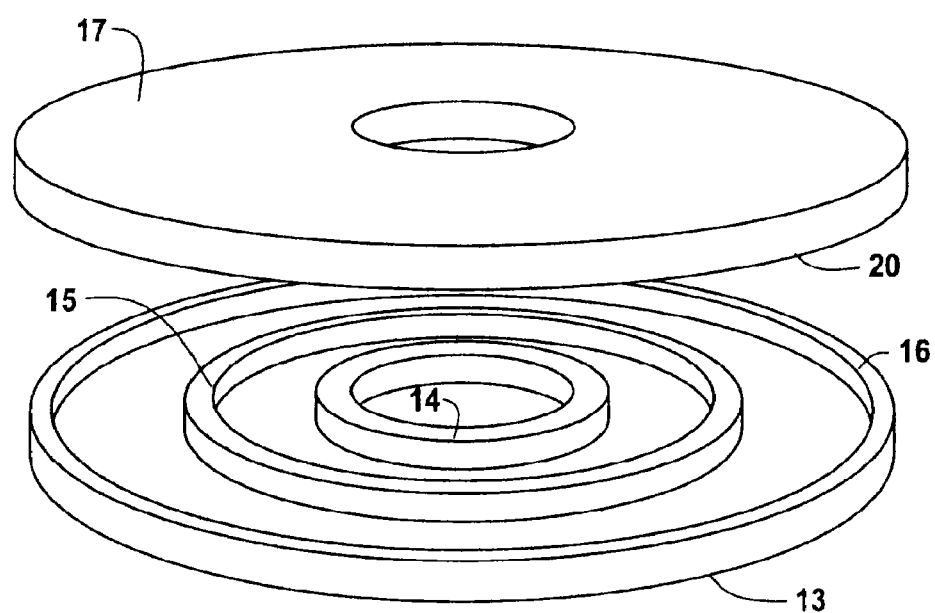
FIG. 6 is an exploded perspective view of the magnetic circuit of the FIG. 5 transformer.

FIG. 5 shows a transformer 110 in a second embodiment of the invention. The transformer 110 may be considered as being an "E-shaped" or a "pot-shaped" variant of the "U-shaped" transformer 10 of FIG. 1. The same references are therefore used as in FIG. 5 and in FIG. 1, without risk of confusion, and a detailed description of the transformer 110 is omitted. It is merely mentioned that, as can be seen in FIG. 6, which is an exploded perspective view of the magnetic circuit of the transformer 110, the references 13 and 17 correspond to two axially spaced-apart rings, the legs 14 to 16 and 18 to 20 extending axially between the two rings 13 and 17, and that the magnetic cores in this example are situated in the columns.

In known manner in the field of transformers, a transformer may have a plurality of secondaries. Thus, in an embodiment not shown, a transformer comprises a three-phase portion at its primary, and at its secondary a portion that presents the same magnetic structure as the portion 12 of the transformer 10, at least one set of three-phase coils (e.g. connected on the same principle as the coils 24 to 27), and a set of two-phase coils like the transformer 10. The three-phase and two-phase coils of the secondary are to be found in the same slots 34 and 35.

This makes it possible in balanced manner to feed an arbitrary number of loads from a three-phase source. For example, in order to feed eleven loads, it is possible to use three three-phase secondaries and one two-phase secondary (11=3*3+2).

As explained above, the topology of the three-phase portion 11 makes it possible to reproduce the fluxes of a three-column static transformer with forced linked fluxes. Thus, in a variant, the three-phase portion of the transformer may present a topology that is different from that shown, while nevertheless enabling the same fluxes to be reproduced.

The invention claimed is:

1. A three-phase/two-phase rotary transformer comprising:
a three-phase portion and a two-phase portion that are movable in rotation relative to each other about an axis A;
the three-phase portion comprising a first body made of ferromagnetic material and three-phase coils, the two-phase portion comprising a second body made of ferromagnetic material and two-phase coils;
the second body defining a first annular slot of axis A and a second annular slot of axis A, the first slot being defined by a first side leg, a central leg, and a ring, the second slot being defined by the central leg, a second side leg, and the ring; and
the two-phase coils comprising a first toroidal coil of axis A in the first slot, a second toroidal coil of axis A in the first slot, a third toroidal coil of axis A in the second slot, and a fourth toroidal coil of axis A in the second slot, the first coil and the second coil being connected in series, the second coil and the third coil being connected in series;
wherein given winding directions and connection directions of the coils, a current flowing in the first coil and the fourth coil corresponds, for the first coil, to a first magnetic potential and, for the fourth coil, to a second magnetic potential opposite to the first magnetic potential, and a current flowing in the second coil and in the third coil corresponds, for the second coil, to a third magnetic potential and, for the third coil, to a fourth magnetic potential opposite to the second magnetic potential.

2. A transformer according to claim 1, wherein the first coil and the third coil each presents a number $n_a$ of turns, and the second coil and the fourth coil each presents a number $n_b$ of turns, with $n_a=(2+\sqrt{3})n_b$.

3. A transformer according to claim 1, wherein the three-phase portion surrounds the two-phase portion around the axis A, or vice versa.

4. A transformer according to claim 1, wherein the three-phase portion and the two-phase portion are situated one beside the other in the direction of the axis A.

5. A transformer according to claim 1, wherein the first and second bodies made of ferromagnetic material completely surround the three-phase and two-phase coils.

6. A transformer according to claim 1, wherein the first body defines a third annular slot of axis A and a fourth annular slot of axis A, the third slot being defined by a third side leg, a second central leg, and a second ring, the fourth slot being defined by the second central leg, a fourth side leg, and the second ring;
the three-phase coils comprising a fifth toroidal coil of axis A in the third slot, a sixth toroidal coil of axis A in the third slot, a seventh toroidal coil of axis A in the fourth slot, and an eighth toroidal coil of axis A in the fourth slot, the sixth coil and the seventh coil being connected in series.

7. A transformer according to claim 1, wherein the two-phase portion further comprises at least one set of three-phase coils.

* * * * *